United States Patent Office 3,330,630
Patented July 11, 1967

3,330,630
SINTERED POROUS BEARING OF Fe AND A POWDERED Cu-BASE ALLOY
James Oakley, Ipswich, England, assignor to Manganese Bronze Limited, Ipswich, England, a British corporate body
No Drawing. Filed Aug. 8, 1966, Ser. No. 570,762
Claims priority, application Great Britain, Aug. 10, 1965, 34,200/65
8 Claims. (Cl. 29—182)

ABSTRACT OF THE DISCLOSURE

A sintered porous bearing is formed of a mixture of metal powders consisting of at least 60% by weight of iron powder, and the remainder substantially wholly of a copper-base alloy. The copper base alloy may consist of 70% by weight of copper with one or more of the following constituents, namely, tin, lead, zinc.

---

This invention relates to bearings for rotatable shafts and the like.

Porous bearings are known which are manufactured by mixing, pressing and sintering metal powders. A common form of such a bearing is made from copper powder and tin powder mixed in suitable proportions, and sintered at a suitable temperature to form a porous bronze bearing. The sintering temperature for such a mixture is comparatively low (and the sintering operation therefore comparatively cheap), but the powders used are rather expensive which increases the manufacturing cost of such a bearing. Moreover such bearings are not suitable for running at loads of more than about 5000 lbs. per square inch.

A bearing suitable for heavier loads up to about 15,000 lbs. per square inch is also known, made by sintering a mixture of iron powder with copper powder, the proportion of the latter being up to 25% by weight. Iron powder is cheaper, and the overall cost of this latter bearing is less than that of the first mentioned bronze bearing, but it is necessary to carry out the sintering operation at a substantially higher temperature than for the bronze bearing, and this considerably reduces the saving of cost arising from the use of the cheaper powder.

The object of the present invention is to provide a bearing which is cheaper to produce than the known bearings referred to above.

With this in view the invention consists in a bearing formed by sintering a mixture of metal powders comprising at least 60% by weight of iron powder, and a proportion of a powdered copper-base alloy having a melting point significantly lower than the melting point of copper.

The iron powder may be prepared from Swedish sponge iron, or a mixture of sponge iron and atomised iron. A copper-containing alloy which has been found suitable for use with such an iron powder is formed from gun metal. The composition of a suitable gun metal may comprise 85% copper, 5% tin, 5% lead and 5% zinc (the proportions being by weight).

The powder mixture may comprise 10% to 40% of powdered gun metal, three-quarters of 1% of a pressing lubricant (and possibly a small amount of oil), the balance being of iron powder as indicated above. The powders being mixed and compacted in a die of desired shape and dimensions may then be sintered at a temperature in the range of 815–880° C. for a period ranging from, say, 5 to 15 minutes. The sintering is preferably carried out in a non-reactive atmosphere, e.g. of cracked ammonia, or endothermically cracked town gas. Convenient lubricants which may be used are paraffin wax or stearic acid.

It is preferred that the finished bearing shall have a porosity of at least 20%, and the materials and conditions of manufacture should be selected with this in mind.

A preferred composition of the powder mix comprises 20–25% by weight of powdered gun metal, of the composition referred to above, three-quarters of 1% of lubricant, and the balance of iron powder, this mixture being sintered at a temperature of 830–860° C. for a period of 6–13 minutes, in an atmosphere of ammonia or town gas as indicated above.

It would appear that when bearings are being manufactured in the manner described above using iron powder as a main constituent the second constituent (in the cases above described, gun metal) should interact with the iron powder in order to bond the whole of the bearing together. This interaction however should not be too great as there should be free second constituent to act as a bearing surface. The second constituent must act both as a binder and a bearing surface, with the iron powder simply acting as a cheap filler material. The second constituent must also be capable of being sintered together itself when in the form of a compacted powder, and it must do so at a temperature significantly less than 1083° C., the melting point of copper, in order to be economically attractive. By "significantly less" is meant a difference of at least 120° C.

Alloys which satisfy the above conditions include copper-based alloys, gun-metal being one example, or copper containing alloys such as the silver solders. Alloys with higher zinc content may be used with more difficulty, but an aluminium-containing copper alloy is not acceptance owing to its lack of sinterability. Tin is suitable and is preferred as the second constituent in the copper alloys.

In carrying the invention into effect the following principles should be observed:

(a) The powder mixture consists of iron powder with 10% to 40% by weight of a copper-base alloy powder, and preferably about 20%.

(b) The iron powder may be atomised, sponge iron, or electrolytic iron, or any other commercially produced iron powder.

(c) The copper-base alloy should contain a minimum of 70% copper.

(d) The copper-base alloy should contain tin in the range 5% to 15% by weight.

(e) To this basic copper-tin alloy, up to 25%, lead and/or 5% zinc may be added, either singly or together.

(f) The iron, and copper-base alloy powders are preferably —100 mesh in particle size.

(g) The temperature at which the pressed iron, and copper-base alloy powder mixture are sintered, is preferably within 25° C. of the solidus temperature of the copper-base alloy. The time of sintering at this temperature should be sufficiently long to produce sintered bearings having a radial crushing factor K of at least 17,500. It is generally better, to sinter above the solidus temperature of the copper-base alloy.

A K value of 17,500 will ensure that the bearings will have a PV factor in excess of 50,000. In other words, the bearings will perform at least as good as sintered bronze bearings.

(h) The powders should be pressed, in a die, at such a pressure that on subsequent sintering the bearings have densities in the range 5.6 to 6.2 gm./ml. The lower limit for any combination of iron and copper-base alloy powder will be set by the strength requirement in paragraph (g) above. The upper limit is also set by the condition that the bearing should have at least 20% porosity.

Examples complying with the above conditions are:

(i) 80% Iron, 20% of an alloy consisting of 85% Cu, 5% Pb, 5% Sn, 5% Zn.
  Final density 5.7 gm./ml.

Sintered for 6 minutes at 880° C. (i.e. solidus +25° C.).
K value in excess of 17,500.

(ii) 85% Iron, 15% of an alloy consisting of 85% Cu, 5% Pb, 5% Sn, 5% Zn.
Final density 5.7 gm./ml.
Sintered for 10 minutes at 830° C. (i.e. solidus −25° C.).
K value in excess of 17,500.

(iii) 80% Iron, 20% of an alloy containing 80% Cu, 10% Sn, 10% Pb.
Final density 6.0 gm./ml.
Sintered for 10 minutes at 815° C. (i.e. solidus +15° C.).
K value in excess of 17,500.

(iv) 80% Iron, 20% of an alloy containing 87% Cu, 8% Sn, 1% Pb, 4% Zn.
Final density 6.0 gm./ml.
Sintered for 10 minutes at 865° C. (i.e. solidus +15° C.).
K value in excess of 17,500.

In all these the iron used is preferably −100 mesh Swedish sponge iron powder.

Although the alloy additions have been specified as closely as possible, other additions may be made to these alloys in order effectively to produce bearings in accordance with the invention.

From the above description it will be seen that the invention provides bearings, and a method of making bearings, which are found to be satisfactory in use, and can be produced at a cost substantially less than that of known porous bearings. A typical bearing produced in accordance with the invention has a sintered density of about 5.8–6.2 grams/ml. and at least 20% porosity.

It should however be understood that the invention is not limited solely to the details of the forms described above, which may be modified, in order to meet various conditions and requirements encountered, without departing from the scope of the invention.

What I claim is:
1. A sintered bearing consisting of at least 60% by weight of iron powder, with the remainder substantially wholly of powdered copper-base metal alloy of melting point lower than the melting point of copper, formed as a sintered porous mass having a porosity of at least 20%.
2. A sintered bearing as claimed in claim 1 wherein the copper-base alloy contains at least 70% by weight of copper.
3. A sintered bearing as claimed in claim 1 wherein the copper-base alloy contains a proportion of tin between 5% and 15% by weight.
4. A sintered bearing as claimed in claim 1 wherein the copper-base alloy contains lead in a proportion up to 25% by weight.
5. A sintered bearing as claimed in claim 1 wherein the copper-base alloy contains zinc in a proportion up to 5% by weight.
6. A sintered bearing as claimed in claim 1 wherein the particles of the metal powders are −100 mesh in size.
7. A sintered bearing as claimed in claim 1 wherein the copper-base alloy has a melting point at least 120° C. below the melting point of copper.
8. A sintered bearing as claimed in claim 1 wherein the sintered metal mass has a density in the range 5.6 to 6.2 grams per millilitre.

References Cited

UNITED STATES PATENTS

| | | | |
|---|---|---|---|
| 1,992,548 | 2/1935 | Short | 29—182 |
| 2,561,579 | 7/1951 | Lenel | 29—182.1 X |
| 2,585,430 | 2/1952 | Boegehold | 29—182 X |
| 2,665,999 | 1/1954 | Koehring | 29—182.1 X |
| 2,706,693 | 4/1955 | Hallar | 29—182.1 X |
| 2,783,145 | 2/1957 | Boyce | 29—182.1 X |

OTHER REFERENCES

Goetzel, "Treatise on Powder Metallurgy," vol. I, Interscience Publishers, Inc., N.Y., 1949, pp. 214–215, 562–566, and 568–570.

Jones, "Fundamental Principles of Powder Metallurgy," Edward Arnold (Publishers) Ltd. London, 1960, pp. 508–509, and 601–602.

BENJAMIN R. PADGETT, *Primary Examiner.*

A. J. STEINER, *Assistant Examiner.*